United States Patent [19]

Spietschka et al.

[11] 4,253,839

[45] Mar. 3, 1981

[54] PROCESS FOR THE FINE DISTRIBUTION OF PIGMENTS OF THE DIOXAZINE SERIES

[75] Inventors: Ernst Spietschka, Idstein; Manfred Urban, Wiesbaden; Erich Paulus, Eppstein, all of Fed. Rep. of Germany

[73] Assignee: Hoechst Aktiengesellschaft, Frankfurt am Main, Fed. Rep. of Germany

[21] Appl. No.: 943,950

[22] Filed: Sep. 20, 1978

[30] Foreign Application Priority Data

Sep. 22, 1977 [DE] Fed. Rep. of Germany ....... 2742575

[51] Int. Cl.$^3$ .................... C09B 19/02; C09B 67/00
[52] U.S. Cl. ................................. 8/565; 106/288 Q; 241/5; 241/29
[58] Field of Search ............. 8/79; 106/288 Q; 241/5, 241/29

[56] References Cited

U.S. PATENT DOCUMENTS

| 2,857,400 | 10/1958 | Cooper | 241/29 |
| 3,126,293 | 3/1964 | McSheehy et al. | 106/288 Q |
| 3,127,412 | 3/1964 | Gaertner et al. | 106/288 Q |
| 3,598,625 | 8/1971 | Buckwalter | 106/288 Q |
| 3,615,800 | 10/1971 | Spietschka et al. | 106/288 Q |
| 4,069,783 | 1/1978 | Morgan | 241/29 |
| 4,165,840 | 8/1979 | Lewis et al. | 241/29 |

FOREIGN PATENT DOCUMENTS

| 660704 | 4/1963 | Canada | 106/288 Q |
| 1225598 | 9/1966 | Fed. Rep. of Germany . | |
| 347924 | 7/1960 | Switzerland | 106/288 Q |
| 956515 | 4/1964 | United Kingdom | 106/288 Q |

OTHER PUBLICATIONS

Chemical Abstracts, vol. 52, 1958, p. 17733g.

*Primary Examiner*—Ronald W. Griffin
*Attorney, Agent, or Firm*—Curtis, Morris & Safford

[57] ABSTRACT

Coarsely crystalline crude dioxazine pigments are subjected to dry milling while maintaining their crystallinity as far as possible until the desired degree of fineness is reached and then treated with a solvent.

15 Claims, 1 Drawing Figure

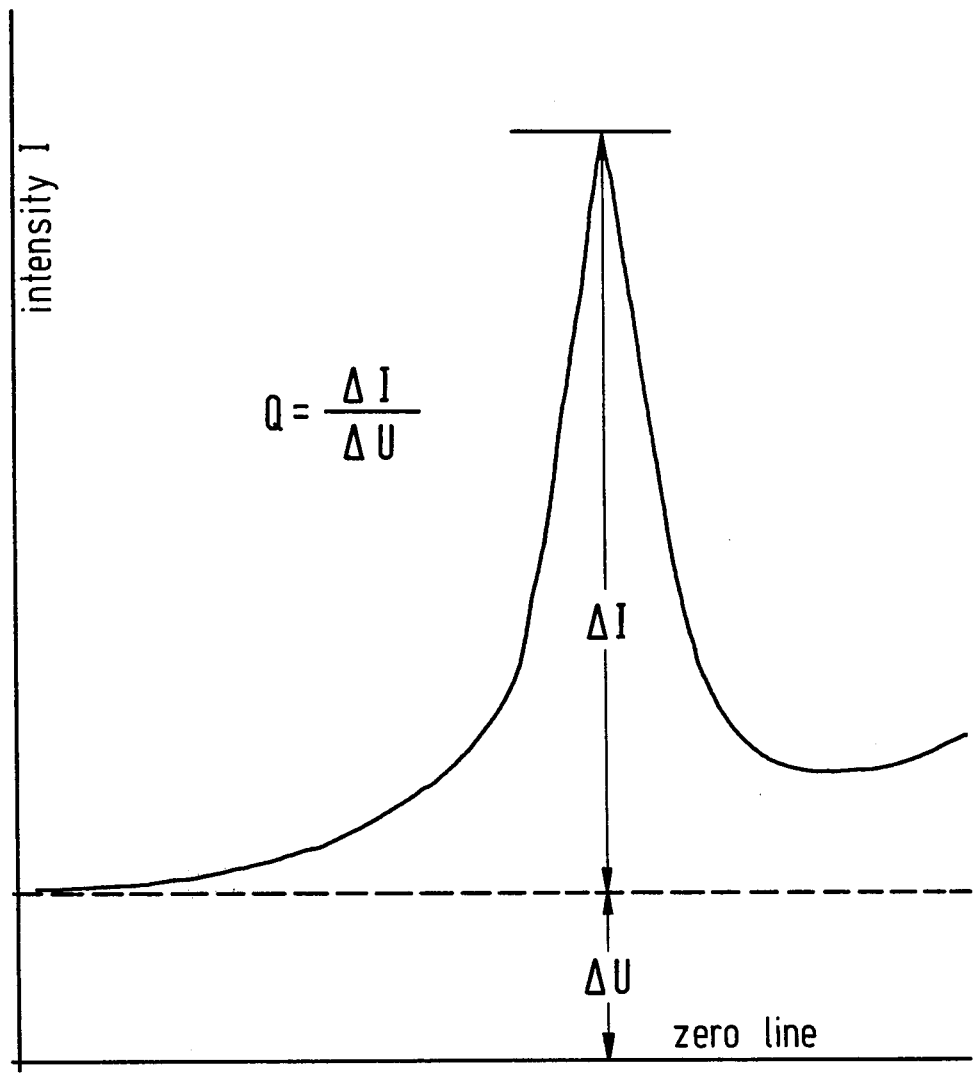

PROCESS FOR THE FINE DISTRIBUTION OF PIGMENTS OF THE DIOXAZINE SERIES

It is known that the useful properties of a pigment depend substantially on the size and on the physical properties of the primary grain. Since especially rather expensive pigments should have a very high tinctorial strength and a weather-proofness as good as possible in practice, the attainment of a fine particle size and desirable particle distribution is of decisive importance for all pigments that are synthetically produced in coarsely crystalline form, for example dioxazines. Generally two methods may be used for this purpose:

1. Reprecipitation from a solvent (especially an acid) and
2. Grinding.

It is known from German Pat. No. 946,560 to reciprocate dioxazines with dichloroacetic acid or aromatic sulfonic acids (sulfuric acid is not suitable, since it has a sulfurizing effect). In addition to the fact that the resulting product must be isolated by an expensive procedure and be washed neutral, this process has the disadvantage that the waste water must be worked up for ecological reasons, which step, however, is not tolerable from the economical point of view. Furthermore, the described process is very sensitive to the presence of impurities and, consequently, it is difficult to achieve reproducible results therewith.

The process disclosed in British Pat. No. 1,240,278 requires as grinding auxiliaries inorganic salts in a ratio of 1:9, which must be separated from the pigment in a separate step upon completion of the pigment preparation process. This process is uneconomic both with regard to the materials employed and with regard to the amount of involved work, since large amounts of inorganic salts must be removed from the waste water in order to keep the waste water clean.

In the process disclosed in German Pat. No. 1,225,598 the crude pigments are ground until their crystalline structure is completely destroyed. The damage caused to the crystal lattices by this process cannot be repaired by a subsequent solvent treatment and, consequently, the resulting pigments show coloristic deficiencies, especially a poor weather-proofness.

On principle, in any grinding processes, even in the presence of grinding auxiliaries, a reagglomeration caused by the grinding energy occurs in addition to the desired fragmentation of the employed large crystals. The present invention, consequently, is concerned with the problem of providing a process in which the required degree of comminution is attained, while a reagglomeration is suppressed as far as possible. In contradistinction to the processes described in the British Pat. No. 1,240,278 and German Pat. No. 1,225,598 it is an object of the present invention to provide a process for producing finely comminuted pigments having a desired particle distribution, which does not involve a complete destruction of the lattice of the crude pigment, but in which the highly crystalline structure of the crude pigment remains unchanged as far as possible.

The present invention, consequently, provides a process for achieving finely divided pigments of the dioxazine series by dry milling of a coarsely crystalline crude pigment, which comprises grinding the crude pigment to the desired degree of fineness while the crystallinity is substantially maintained, and is subsequently submitted to a solvent treatment.

As in all fine comminution processes, especially in grinding processes the desired degree of fineness must be controlled in simple manner. It has how been found that the X-ray diffraction spectrum is a simple, rapid and infallible method for controlling the comminution process. To this end, a suitable peak is chosen in the X-ray spectrum, the absolute height of which is compared with the absolute height of the background noise level of the spectrum. The quotient obtained serves as an index and, consequently, as a characteristic for the quality (measuring number for crystal size and crystal quality) for the attained degree of grinding of the pigment. Spectra with Cu $K_\alpha$ radiation are preferred.

Some preferred embodiments of the process of the invention will be described hereinafter: Grinding may be effected in a roller or vibration mill under mill grinding conditions. This object is attained in most economical manner, when working with a vibration mill lined preferably with a flexible material and which is operated in a way such that the grinding bodies mainly have rotating movements and that their kinetic energy is kept as small as possible by the choice of the mass and the size and by the frequency and amplitude of the vibration of the mill. Furthermore the proportion of grinding bodies in the mill charge is considerable. The grinding bodies used have a surface free from pores to prevent a cementation on their surface.

It is not required to remove the salts possibly formed during the synthesis of the crude pigment, prior to grinding. As grinding is preferably carried out without addition of salt, additional waste water problems do not occur in this case. Naturally, salt may alternatively be added in the grinding process, however, in this case, the dependence of the X-ray index on the salt content should be taken into consideration. All coarsely crystalline crude pigments may be finely subdivided in simple and economical manner under said conditions.

It has been found empirically that the dioxazine "Pigment Violet 23", C.I. No. 51319, if adjusted to an X-ray index of 5.0 to 6.6 during the grinding process, yields an optimum pigment for the use in lacquers and plastics, after finishing, as regards the color shade, the color intensity and the weather-proofness. When grinding is carried out in such a way that the X-ray index is from 2 to 3, there is obtained after finishing, a reddish pigment which gives a deep color, when used in lacquers, but which is not really satisfactory in practice as regards the weather proofness and its suitability for the use in plastics. When the X-ray index is above 6.6, for example near 10, there is obtained an excellently weather-proof pigment having an improved hiding power and a more blueish shade, after finishing.

Since during grinding agglomeration processes occur in addition to the desired comminution of the primary crystal and since the ground material exhibits damaged surfaces, grinding is necessarily followed by a solvent treatment. To this end, a series of solvents may be used, for example aliphatic alcohols of from 1 to 6 carbon atoms, especially isobutanol; lower aliphatic ketones, aromatic and aliphatic chlorohydrocarbons, heterocyclic bases, N-alkylated carboxylic acid amides, carboxylic acids and esters thereof.

When the solvent treatment is carried out in a slightly acidic medium, with the use of the 1.5-fold quantity of isobutanol, at room temperature, a progressive wetting and desagglomeration of the ground product which becomes evident in a pronounced increase of the viscosity of the batch, can be observed. This process is terminated, when the viscosity changes no more. Finishing is terminated by incrasing the temperature to 150° C., preferably to 80° to 125° C., and thereafter the pigment is isolated in known manner.

Depending on the intended coloristic application purpose, it may be advisable in some cases to use surfactants prior to or after the desagglomeration or prior to or after the temperature treatment. For example, colophony resins modified with unsaturated carboxylic acids, such as alcohol-soluble colophony resins modified with acrylic, maleic or fumaric acid, lead to an improvement of the dispersability in lacquers and to an improved applicability of the pigments for use in printing pastes.

The following examples illustrate the invention. Percentages are by weight.

EXAMPLE 1

387 kg of Pigment Violet 23, C.I. 51319, (salt free) are ground twice with 2100 kg of grinding bodies ("Cylpebs", diameter 12 mm, manufactured by Groh GmbH/Hof) in a vibration mill (of the type Palla U 50, manufactured by Humboldt Wedag/Cologne) lined with polypropylene, at a rate of 20 kg per hour at a temperature of from 80° to 100° C. in a way that the grinding bodies mainly have rotating movements (r.p.m 1000, oscillation circuit 10 mm, proportion of grinding bodies of the available volume 90%). The ground material shows an index of 6.5 (quotient of the absolute peak of the X-ray reflection with Cu K$_{60}$ radiation at 5.2°$\theta$ and of the average absolute height of the noise; cf. figure). The ground material having said index is, consequently, appropriate for the intended purpose and may be added to the solvent finish.

675 g of 85% isobutanol are introduced into a stirrer vessel. 45 kg of 84% phosphoric acid are added, while stirring, and subsequently 2.25 kg of 50% resin soap. Stirring is continued for 1 hour and thereafter the above ground material is introduced while stirring. Stirring is continued for 14 hours at room temperature, thereafter 2700 liters of drinking water are added, and isobutanol is distilled off azeotropically at a temperature of up to 100° C. 675 kg of 85% isobutanol are recovered which may by reused in the form obtained. The distillation residue is suction-filtered and washed neutral. 387 g of finished product are obtained, which is excellently suitable for dyeing lacquers and plastic masses.

EXAMPLE 2

450 kg of Pigment Violet 23, C.I. 51319, (containing 14% of salt from its preparation) are ground twice with 2100 kg of "Cylpebs" (diameter 12 mm) as grinding bodies in a vibration mill (of the type Palla U 50, manufactured by Humbold Wedag/Cologne) lined with rubber, at a rate of 23 kg per hour at a temperature of from 80° to 100° C. in such a way that the grinding bodies mainly rotate (r.p.m. 1,000, oscillation circuit 10 mm, proportion of grinding bodies of the available volume 90%) . The ground material shows an index number of 5.9 and is, consequently, appropriate for the desired application purposes. Thus, it may be added to the solvent finish.

675 kg of 85% isobutanol are placed into a stirrer vessel. 45 kg of a 84% phosphoric acid are added thereto while stirring and subsequently 4.5 kg of alcohol-soluble colophony-maleinate resin (melting point (capillary method) 120° to 130° C., acid number about 120 (® Alresat KM 706)). Stirring is continued for 1 hour, and thereafter the ground material is introduced while stirring. Stirring is continued for 14 hours at room temperature, thereafter 2700 liters of drinking water are added and the isobutanol is distilled off azeotropically at a temperature of up to 100° C. 675 kg of a 85% isobutanol are recovered and may be reused in this form. The distillation residue is suction-filtered and washed neutral. 387 of finished product are obtained, which is excellently suitable for dyeing lacquers and plastics masses.

EXAMPLE 3

30 g of Pigment Violet 23, C.I. 51319, (containing 14% of salt from its synthesis) are ground with 1575 g of "Cylpebs" (diameter 12 mm) as grinding bodies in a liter vibration mill (of the type Vibratom, manufactured by Siebtechnik, Mühlheim) consisting of polypropylene, for two hours in a way that the grinding bodies mainly rotate (r.p.m. 1,400; oscillation circuit 4 mm). A ground material having an index number of 5.9 is obtained. Since the desired degree of fineness is attained, the ground material can be added to the solvent finish.

38.5 g of 85% isobutanol are placed into a stirrer vessel. 2.6 g of a 84% phosphoric acid are added while stirring. Thereafter the ground material is introduced and stirred for 14 hours at room temperature. Thereafter 154 ml of drinking water are added and the isobutanol is distilled off azeotropically until a temperature of 100° C. is reached. 38.5 g of 85% isobutanol are recovered, which may be reused in this form. The distillation residue is suction-filtered and washed neutral. 25.5 g of finished product are obtained, which is excellently suitable for dyeing lacquers and plastics masses.

EXAMPLE 4

30 g of Pigment Violet 23, C.I. 51319, (containing 14% of salt from its synthesis) are ground with 1250 g of porcelain balls (diameter 12 mm) as grinding bodies for two hours in the vibration mill described in Example 3 in a way that the grinding bodies mainly rotate (r.p.m. 1400, oscillation circuit 4 mm). A ground material having an index number of 5.6 is obtained. Since the desired degree of fineness is obtained, the ground material may be added to the solvent finish.

38.5 g of 85% isobutanol are placed into a stirrer vessel. 2.6 g of a 84% phosphoric acid are added thereto while stirring and subsequently 0.26 g of the resin mentioned in Example 2. Stirring is continued for one hour and thereafter the ground material is introduced while stirring. Stirring is continued for 14 hours at room temperature, 154 ml of drinking water are added and the isobutanol is distilled off azeotropically until a temperature of 100° C. is reached. 38.5 g of 85% isobutanol are recovered which may be reused in this form. The distillation residue is suction-filtered and washed neutral. 25.8 g of finished product are obtained which is excellently suitable for dyeing lacquers and plastics masses.

EXAMPLE 5

30 g of Pigment Violet 23, C.I. 51319, (containing 14% of salt from its synthesis) are ground with 1575 g of "Cylpebs" (diameter 12 mm) as grinding bodies for six hours in the vibration mill described in Example 3 in a way that the grinding bodies mainly rotate (r.p.m. 1400, oscillation circuit 4 mm). A ground material having an index number of 2.1 is obtained.

38.5 g of 85% isobutanol are placed into a stirrer vessel. 2.6 g of a 84% phosphoric acid are added thereto while stirring and subsequently 0.26 g of the resin mentioned in Example 2. Stirring is continued for one hour and thereafter the ground material is introduced while stirring. Stirring is continued for 14 hours at room temperature, 154 ml of drinking water are added and the isobutanol is distilled off azeotropically until a temperature of 100° C. is reached. 38.5 g of 85% isobutanol are recovered which may be reused in this form. The distillation residue is suction-filtered and washed neutral. 25.8 g of finished product are obtained which is excellently suitable for dyeing lacquers and plastics masses. The pigment is redder and has a higher tinctorial strength than the product obtained in Example 1.

EXAMPLE 6

30 g of Pigment Violet 23, C.I. 51319 (containing 14% of salt from its synthesis) are ground with 1575 g of "Cylpebs" (diameter 12 mm) as grinding bodies for one hour in the vibration mill described in Example 3 in a way that the grinding bodies mainly rotate (r.p.m. 1400, oscillation circuit 4 mm). A ground material having an index number of 8.1 is obtained.

38.5 g of 85% isobutanol are placed into a stirrer vessel. 2.6 g of a 84% phosphoric acid are added thereto while stirring and subsequently 0.26 g of the resin mentioned in Example 2. Stirring is continued for one hour and thereafter the ground material is introduced while stirring. Stirring is continued for 14 hours at room temperature, 154 ml of drinking water are added and the isobutanol is distilled off azeotropically until a temperature of 100° C. is reached. 38.5 g of 85% isobutanol are recovered which may be reused in this form. The distillation residue is suction-filtered and washed neutral. 25.8 g of finished product are obtained which is excellently suitable for dyeing lacquers and plastics masses. The pigment is bluer than that one obtained according to Example 1.

EXAMPLE 7

30 g of Pigment Violet 23, C.I. 51319 (containing 14% of salt from its synthesis) are ground with 1575 g of "Cylpebs" (diameter 12 mm) as grinding bodies for two hours in the vibration mill described in Example 3 in a way that the grinding bodies mainly rotate (r.p.m. 1400, oscillation circuit 4 mm). A ground material having an index number of 5.9 is obtained. Since the desired degree of fineness is obtained, the ground material may be added to the solvent finish.

38.5 g of 85% isobutanol are placed into an autoclave. 2.6 g of a 84% phosphoric acid are added thereto while stirring and subsequently 0.26 g of the resin mentioned in Example 2. Stirring is continued for one hour and thereafter the ground material is introduced while stirring. Stirring is continued for 14 hours at room temperature, 154 ml of drinking water are added and the batch is heated to 125° C. for 3 hours. Thereafter it is cooled and the isobutanol is distilled off azeotropically until a temperature of 100° C. is reached. 38.5 g of 85% isobutanol are recovered which may be reused in this form. The distillation residue is suction-filtered and washed neutral. 25.8 g of finished product are obtained which is excellently suitable for dyeing lacquers and plastics masses.

EXAMPLE 8

30 g of Pigment Violet 23, C.I. 51319 (containing 14% of salt from its synthesis) are ground with 1575 g of "Cylpebs" (diameter 12 mm) as grinding bodies for two hours in the vibration mill described in Example 3 in a way that the grinding bodies mainly rotate (r.p.m. 1400, oscillation circuit 4 mm). A ground material having an index number of 5.9 is obtained. Since the desired degree of fineness is obtained, the ground material may be added to the solvent finish.

42.8 g of acetone are placed into a stirrer vessel. 2.6 g of a 84% phosphoric acid are added thereto while stirring and subsequently 0.26 g of dimerized colophony resin ( ®Dymerex Resin manufactured by the film Hercules). Stirring is continued for one hour and thereafter the ground material is introduced while stirring. Stirring is continued for 14 hours at room temperature, 154 ml of drinking water are added and the acetone is distilled of azeotropically until a temperature of 100° C. is reached. The distillation residue is suction-filtered and washed neutral. 25.8 g of finished product are obtained which is excellently suitable for dyeing lacquers and plastics masses.

EXAMPLE 9

30 g of Pigment Violet 23, C.I. 51319 (containing 14% of salt from its synthesis) are ground with 1575 g of "Cylpebs" (diameter 12 mm) as grinding bodies for two hours in the vibration mill described in Example 3 in a way that the grinding bodies mainly rotate (r.p.m. 1400, oscillation circuit 4 mm). A ground material having an index number of 5.9 is obtained. Since the desired degree of fineness is obtained, the ground material may be added to the solvent finish.

42.8 g of glacial acetic acid are placed into a stirrer vessel. 2.6 g of a 84% phosphoric acid are added thereto while stirring and subsequently 0.26 g of alcohol-soluble fumaric acid-colophony resin (density 1.15, acid number 110-130, color number <30 (Alresat KM 400). Stirring is continued for one hour and thereafter the ground material is introduced while stirring. Stirring is continued for 14 hours at room temperature, then 154 ml of drinking water are added. The distillation residue is suction-filtered and washed neutral. 25.8 g of finished product are obtained which is excellently suitable for dyeing lacquers and plastic masses.

EXAMPLE 10

30 g of Pigment Violet 23, C.I. 51319 (containing 14% of salt from its synthesis) are ground with 1575 g of "Cylpebs" (diameter 12 mm) as grinding bodies for two hours in the vibration mill described in Example 3 in a way that the grinding bodies mainly rotate (r.p.m. 1400, oscillation circuit 4 mm). A ground material having an index number of 5.9 is obtained. Since the desired degree of fineness is obtained, the ground material may be added to the solvent finish.

57 g of chlorobenzene are placed into a stirrer vessel. 2.6 g of a 84% phosphoric acid are added thereto while stirring and subsequently 0.26 g of dimerized colophony resin. Stirring is continued for one hour and thereafter the ground material is introduced while stirring. Stirring is continued for 14 hours at room temperature, 154 ml of drinking water are added and the chlorobenzene is distilled off. The distillation residue is suction-filtered and washed neutral. 25.8 g of finished product are obtained which is excellently suitable for dyeing lacquers and plastic masses.

EXAMPLE 11

30 g of Pigment Violet 23, C.I. 51319 (containing 14% of salt from its synthesis) are ground with 1575 g of "Cylpebs" (diameter 12 mm) as grinding bodies for two hours in the vibration mill described in Example 3 in a way that the grinding bodies mainly rotate (r.p.m. 1400, oscillation circuit 4 mm). A ground material having an index number of 5.9 is obtained. Since the desired degree of fineness is obtained, the ground material may be added to the solvent finish.

42.8 g of acetic acid ethyl ester are placed into a stirrer vessel. 2.6 g of a 84% phosphoric acid are added thereto while stirring and subsequently 0.26 g of dimerized colophony resin. Stirring is continued for one hour and thereafter the ground material is introduced while stirring. Stirring is continued for 14 hours at room temperature, then 154 ml of drinking water are added and the acetic acid ethyl ester is distilled off azeotropically. The distillation residue is suction-filtered and washed neutral. 25.8 g of finished product are obtained which is excellently suitable for dyeing lacquers and plastic masses.

EXAMPLE 12

30 g of Pigment Violet 23, C.I. 51319 (containing 14% of salt from its synthesis) are ground with 1575 g of "Cylpebs" (diameter 12 mm) as grinding bodies for two hours in the vibration mill described in Example 3 in a way that the grinding bodies mainly rotate (r.p.m. 1400, oscillation circuit 4 mm). A ground material having an index number of 5.9 is obtained. Since the desired degree of fineness is obtained, the ground material may be added to the solvent finish.

142.5 g of pyridine are placed into a stirrer vessel. 0.26 g of dimerized colophony resin are added while stirring. Stirring is continued for one hour and thereafter the ground material is introduced while stirring. Stirring is continued for 14 hours at room temperature, then 154 ml of drinking water are added. The distillation residue is suction-filtered and washed free from pyridine. 25.8 g of finished product are obtained which is excellently suitable for dyeing lacquers and plastic masses.

EXAMPLE 13

30 g of Pigment Violet 23, C.I. 51319 (containing 14% of salt from its synthesis) are ground with 1575 g of "Cylpebs" (diameter 12 mm) as grinding bodies for two hours in the vibration mill described in Example 3 in a way that the grinding bodies mainly rotate (r.p.m. 1400, oscillation circuit 4 mm). A ground material having an index number of 5.9 is obtained. Since the desired degree of fineness is obtained, the ground material may be added to the solvent finish.

85.5 g of dimethylformamide are placed into a stirrer vessel. 2.6 g of a 84% phosphoric acid are added thereto while stirring and subsequently 0.5 g of a 50% resin soap. Stirring is continued for one hour and thereafter the ground material is introduced while stirring. Stirring is continued for 14 hours at room temperature, and 154 ml of drinking water are added. The distillation residue is suction-filtered and washed neutral. 25.8 g of finished product are obtained which is excellently suitable for dyeing lacquers and plastic masses.

EXAMPLE 14

30 g of Pigment Violet 23, C.I. 51319 (containing 14% of salt from its synthesis) are ground with 1575 g of "Cylpebs" (diameter 12 mm) as grinding bodies for two hours in the vibration mill described in Example 3 in a way that the grinding bodies mainly rotate (r.p.m. 1400, oscillation circuit 4 mm). A ground material having an index number of 5.9 is obtained. Since the desired degree of fineness is obtained, the ground material may be added to the solvent finish.

38.5 g of 85% isobutanol are placed into a stirrer vessel. 2.6 g of the resin mentioned in Example 2 are added thereto while stirring. Stirring is continued for one hour and thereafter the ground material is introduced while stirring. Stirring is continued for 14 hours at room temperature, 154 ml of drinking water are added and the isobutanol is distilled off azeotropically until a temperature of 100° C. is reached. 38.5 g of 85% isobutanol are recovered which may be reused n this form. The distillation residue is suction-filtered and washed neutral. 25.8 g of finished product are obtained which is excellently suitable for dyeing lacquers and plastic masses.

EXAMPLE 15

30 g of Pigment Violet 23, C.I. 51319 (containing 14% of salt from its synthesis) are ground by rolling with 2450 g of steel balls (diameter 9 mm) as grinding bodies for 24 hours in a 1-liter plastic mill (polypropylene, diameter 11 cm) (r.p.m. 90, proportion of grinding bodies of the available volume 55%). A ground material having an index number of 2.5 is obtained.

38.5 g of 85% isobutanol are placed into a stirrer vessel. 2.6 g of a 84% phosphoric acid are added thereto while stirring and subsequently 0.26 g of the resin mentioned in Example 2. Stirring is continued for one hour and thereafter the ground material is introduced while stirring. Stirring is continued for 14 hours at room temperature, 154 ml of drinking water are added and the isobutanol is distilled off azeotropically until a temperature of 100° C. is reached. 38.5 g of 85% isobutanol are recovered which may be reused in this form. The distillation residue is suction-filtered and washed neutral. 25.8 g of finished product are obtained which is excellently suitable for dyeing lacquers and plastic masses. The pigment is redder and has a higher tinctorial strength than the product obtained in Example 1.

EXAMPLE 16

38.5 g of 85% isobutanol are placed into a stirrer vessel. Thereafter 0.26 g of the resin mentioned in Example 8 are added while stirring. Stirring is continued for one hour and thereafter the ground material obtained according to Example 3 is added while stirring. Stirring is continued for 14 hours at room temperature, subsequently 154 ml of drinking water are added and the isobutanol is distilled off until a temperature of 100° C. is reached. The distillation residue is suction-filtered and washed neutral. 25.8 g of finished product are obtained which is excellently suitable for dyeing lacquers and plastic masses.

EXAMPLE 17

38.5 g of 85% isobutanol are placed into a stirrer vessel. 1 g of sodium carbonate and subsequently 1.25 g of a 25% aqueous solution of an anion-active auxiliary agent (sodium salt of the tributylphenol polyglycol ether sulfuric acid ester containing of from 7 to 8 ethylene oxide units) containing 1% of urea and little inorganic salts are added while stirring. Stirring is continued for one hour and thereafter the ground material obtained according to Example 3 is added while stirring. Stirring is continued for 14 hours at room temperature, subsequently 154 ml of drinking water are added and the batch is refluxed for 5 hours. Thereafter the isobutanol is distilled off until a temperature of 100° C. is reached. The resulting mixture is allowed to cool to 60° C., subsequently a mixture of 5 g of a 89% phosphoric acid and 75 ml of drinking water is added, and the resulting mixture is stirred for one hour at 60° C. Subsequently the distillation residue is suction-filtered and washed neutral. 25.7 g of finished product are obtained, which is excellently suitable for dyeing lacquers and plastic masses. The pigment is bluer and more dispersible than the product described in Example 2.

EXAMPLE 18

38.5 g of 85% isobutanol are placed into an autoclave. 2.5 g of an aqueous 33% sodium hydroxide solution and 1.25 g of the auxiliary agent described in Example 17 are added subsequently while stirring. Stirring is continued for one hour and thereafter the ground material obtained according to Example 3 is added while stirring. Stirring is continued for 14 hours at room temperature, 154 ml of drinking water are added, the resulting mixture is heated to 125° C. and this temperature is maintained for 5 hours. Subsequently the batch is allowed to cool to 80° C. and thereafter the isobutanol is distilled off azeotropically until a temperature of 100° C. is reached. The resulting mixture is allowed to cool to 60° C., subsequently a mixture of 5 g of a 89% phosphoric acid and 25 ml of drinking water are added and stirring is continued at 60° C. for one hour. Subsequently the distillation residue is suction-filtered and washed neutral. 25.7 g of finished product are obtained, which is excellently suitable for dyeing lacquers and plastic masses. The pigment is bluer and more dispersible than the pigment described in Example 2.

What is claimed is:

1. A process for finely comminuting a dioxazine pigment which comprises introducing into a mill having a flexible lining a coarsely crystallized crude dioxazine pigment and a large amount of rotatable grinding bodies relative to the amount of pigment introduced, said grinding bodies making essentially rotating movements, dry milling the coarse pigment within the mill while substantially maintaining its crystallinity until the desired degree of fineness is obtained, so operating the mill that the grinding bodies mainly have a rotating movement and the transfer of kinetic energy thereto is minimized and subsequently mixing the ground pigment with a solvent to disaggregate it.

2. A process as claimed in claim 1 wherein milling is performed in a vibrating mill.

3. A process as claimed in claim 1, wherein the grinding bodies have a surface as smooth and free of pores as possible.

4. A process as claimed in claim 1, wherein milling is performed without a grinding auxiliary.

5. A process as claimed in claim 1, wherein the desired degree of fineness is controlled by the X-ray pattern of the load.

6. A process according to claim 1 wherein the solvent is a volatile solvent which is removed from the pigment by distillation.

7. A process as claimed in claim 1, wherein the solvent is an aliphatic alcohol of 1 to 6 carbon atoms, a lower aliphatic ketone, a hydrocarbon, a halogenated hydrocarbon, a heterocyclic base, a N-(lower alkyl) or N,N-di-(lower alkyl) lower carboxylic acid amide, a carboxylic acid or a carboxylic acid ester.

8. A process as claimed in claim 7, wherein the solvent is a lower alkanol, acetone, chlorobenzene, ethyl acetate, pyridine, dimethyl formamide or a lower alkanoic acid.

9. A process as claimed in claim 1, wherein the solvent is isobutanol.

10. A process as claimed in claim 1, wherein the solvent treatment is performed in a weakly acidic medium.

11. A process as claimed in claim 1, wherein the solvent treatment is carried out in a neutral or alkaline medium.

12. A process as claimed in claim 1, wherein the solvent treatment is performed with addition of a surfactant.

13. A process according to claim 1 wherein the mixture of pigment and solid is heated to a temperature of up to 150° C.

14. A process for preparing a dioxazine pigment which comprises grinding Pigment Violet 23 in a vibration mill coated with plastic or rubber with a substantially larger amount of grinding bodies having a smooth surface free of pores, the grinding bodies making essentially rotating movements, until in the X-ray pattern with Cu $K_\alpha$-rays the quotient of the height of the peak at 5.2°$\theta$ and the median height of the noise level is in the range of 5 to 6.6, and thereafter treating the milled pigment in a solvent selected from lower alkanol, di-(lower alkyl) ketone, lower alkanoic acid, lower alkanoic acid lower alkyl ester, chlorobenzene, dimethylformamide and pyridine.

15. Pigment obtained by the process as claimed in claim 14.

* * * * *